(12) United States Patent
Cai et al.

(10) Patent No.: US 8,451,988 B2
(45) Date of Patent: May 28, 2013

(54) DELIVERY OF TEXT MESSAGES TO WIRELINE PHONES THROUGH CALLER ID FUNCTIONALITIES

(75) Inventors: Yigang Cai, Naperville, IL (US); Shiyan Hua, Lisle, IL (US)

(73) Assignee: Alcatel Lucent, Paris (FR)

( * ) Notice: Subject to any disclaimer, the term of this patent is extended or adjusted under 35 U.S.C. 154(b) by 1226 days.

(21) Appl. No.: 12/272,611

(22) Filed: Nov. 17, 2008

(65) Prior Publication Data

US 2010/0124318 A1    May 20, 2010

(51) Int. Cl.
*H04M 1/64*  (2006.01)

(52) U.S. Cl.
USPC ............... 379/88.11; 379/88.13; 379/88.21

(58) Field of Classification Search
USPC ............... 379/93.24, 88.11, 88.23, 142.01, 379/142.04
See application file for complete search history.

(56) References Cited

U.S. PATENT DOCUMENTS

| 6,310,944 | B1 * | 10/2001 | Brisebois et al. | 379/142.01 |
| 6,771,755 | B1 * | 8/2004 | Simpson | 379/142.04 |
| 7,443,964 | B2 * | 10/2008 | Urban et al. | 379/88.23 |
| 2004/0258215 | A1 * | 12/2004 | DeVito et al. | 379/88.11 |
| 2011/0026692 | A1 * | 2/2011 | Sharp | 379/88.23 |

* cited by examiner

*Primary Examiner* — Simon Sing
*Assistant Examiner* — Van D Huynh
(74) *Attorney, Agent, or Firm* — Duft Bornsen & Fettig, LLP (57) ABSTRACT

IMS networks, text message systems, and methods are disclosed for delivering text messages to IMS wireline phones. A text message system of an IMS network receives a text message intended for the IMS wireline phone. The text message system identifies capability data for an IMS wireline phone that indicates the capability of the IMS wireline phone for handling text messages. The text message system processes the capability data for the IMS wireline phone to determine if the IMS wireline phone is capable of handling text messages. If the IMS wireline phone is not capable of handling text messages, then the text message system appends the text message to a caller ID header of an IMS signaling message, and forwards the IMS signaling message to the IMS wireline phone to display the text message on a caller ID unit associated with the IMS wireline phone.

20 Claims, 7 Drawing Sheets

DELIVERY OF TEXT MESSAGES TO WIRELINE PHONES THROUGH CALLER ID FUNCTIONALITIES

BACKGROUND OF THE INVENTION

1. Field of the Invention

The invention is related to the field of IMS networks and, in particular, to the delivery of text messages to wireline phones through caller ID functionalities.

2. Statement of the Problem

One type of communication network gaining popularity is an IP Multimedia Subsystem (IMS) network. As set forth in the 3$^{rd}$ Generation Partnership Project (3GPP), IMS provides a common core network having a network architecture that allows for various types of access networks. The access network between a communication device and the IMS network may be a cellular network (e.g., CDMA or GSM), a WLAN (e.g., WiFi or WiMAX), an Ethernet network, or another type of wireless or wireline access network. The IMS architecture is initially defined by the 3GPP to provide multimedia services to communication devices over an Internet Protocol (IP) network, as IP networks have become the most cost savings bearer network to transmit video, voice, and data. Service providers are accepting this architecture in next generation network evolution.

Before user equipment (UE) of an IMS subscriber receives service from the IMS network, the UE attempts to register with the IMS network. To register according to 3GPP standards, the UE transmits a register request message, such as a SIP REGISTER, to a Serving-Call Session Control Function (S-CSCF) in the IMS network. Responsive to the register request message, the S-CSCF generates an authentication request message, such as a Diameter Multimedia Authentication Request (MAR), and transmits the authentication request message to a Home Subscriber Server (HSS). The HSS then authenticates the UE, such as through the AKA authentication method. If the UE is authenticated, then the S-CSCF generates a service profile request message, such as a Diameter Server Assignment Request (SAR), and transmits the service profile request message to the HSS. Responsive to the service profile request message, the HSS identifies the service profile for the user of the UE. The HSS then transmits a response message, such as a Diameter Server Assignment Answer (SAA), to the S-CSCF that includes the service profile for the user of the UE. The S-CSCF then transmits a register response message, such as a SIP 200 OK that includes information that the UE may use to communicate with the IMS network.

After registration is finished, the UE is able to exchange communications with the IMS network. One popular type of communication is text messaging. Text messaging refers to the interchange of short text message (i.e., typically 160 characters or less) between telephone devices. One type of text messaging is referred to as Short Message Service (SMS). IMS networks, and other types of communication networks, include Short Message Service Centers (SMSC) that manage the interchange of text messages.

To send a text message, a sending party enters text into a UE that is text-enabled, and also enters a phone number or address for the intended recipient of the text message. When the text message is completed, the UE sends the text message to the IMS network. An S-CSCF that is serving the sending party receives the text message and forwards the text message to the SMSC. The SMSC provides a store-and-forward mechanism where the SMSC temporarily stores the text message, and forwards the text message to the S-CSCF serving the recipient of the text message.

Some UE's that register with IMS networks are capable of handling text messages (i.e., they are text-enabled). The text messages are appended to a predefined header of signaling messages, which is how the text messages are sent through the IMS network from one UE to another UE. For example, a text message may be appended to a Content-Length header of a SIP MESSAGE. In order to "handle" text messages, the UE has an application that is operable to receive the signaling message, and process the signaling message to identify the appended text message from the predefined header of the signaling message. The application is further operable to provide a user interface for text messages, and to display the text message through the user interface. The application also allows a user to generate a text message, append the generated text message to the predefined header of a signaling message, and send the signaling message to the IMS network.

One problem encountered by service providers operating IMS networks is that some of the wireline phones (i.e., wireline UE's) that register with the IMS network are not capable of handling text messages. For instance, some VoIP phones are SIP-enabled and are capable of registering with the IMS network, but are not capable of receiving, displaying, or sending text messages. Text messages that are intended for these types of wireline phones unfortunately do not reach their destination.

SUMMARY OF THE SOLUTION

Embodiments of the invention solve the above and other related problems by sending text messages to some IMS wireline phones using caller ID functionalities. Although some IMS wireline phones that register with an IMS network are not capable of handling text messages in the normal fashion, most if not all of these IMS wireline phones have caller ID functionalities. The caller ID functionalities are built into the IMS wireline phone, or are built into an external unit that is connected to the wireline phone. If the IMS network determines that an IMS wireline phone is not capable of handing a text message in a normal fashion, then the IMS network appends the text message to a caller ID header in a signaling message, and sends the signaling message to the IMS wireline phone. Through the caller ID functionalities of the IMS wireline phone, the text message is displayed to the user of the IMS wireline phone through a caller ID window or display. Thus, the user is advantageously able to receive a text message from another party even though their IMS wireline phone is not capable of receiving the text message in the normal fashion.

One embodiment of the invention is a text message system of an IMS network. The text message system includes a capability system that identifies capability data for an IMS wireline phone. The capability data indicates the capability of the IMS wireline phone for handling text messages. The text message system further includes a message forwarding system that receives a text message intended for the IMS wireline phone. The message forwarding system processes the capability data for the IMS wireline phone to determine if the IMS wireline phone is capable of handling text messages. If the IMS wireline phone is not capable of handling text messages, then the message forwarding system appends the text message to a caller identifier (ID) header of an IMS signaling message. The message forwarding system then forwards the IMS signaling message to the IMS wireline phone to display the text message on a caller ID unit associated with the IMS wireline phone.

If the IMS wireline phone is capable of handling text messages, then the message forwarding system appends the text message to a non-caller ID header of the IMS signaling message. The IMS wireline phone then forwards the IMS signaling message to the IMS wireline phone to display the text message on the IMS wireline phone through text message functionalities.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
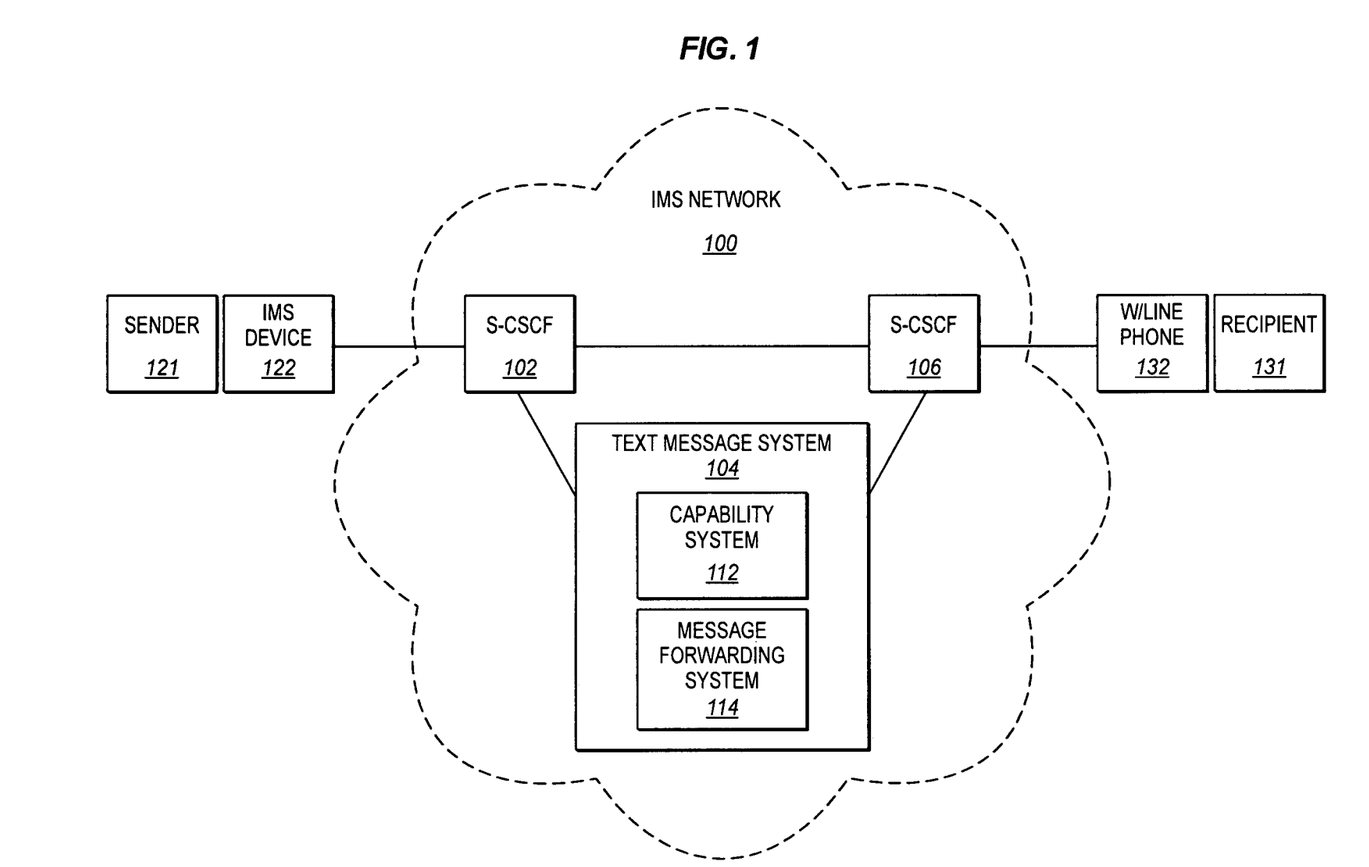
FIG. 1 illustrates an IMS network in an exemplary embodiment of the invention.

FIG. 1 illustrates an IMS network 100 in an exemplary embodiment of the invention. IMS network 100 includes a first Serving-Call Session Control Function (S-CSCF) 102, a text message system 104, and a second S-CSCF 106. S-CSCF 102 comprises any server(s), function(s), or other system operable to provide session control for an IMS device 122 that is accessing services within IMS network 100. IMS device 122 comprises any wireline (or fixed-line) device or mobile device that is able to register with IMS network 100 to receive services. IMS device 122 is capable of handling text messages, meaning that IMS device 122 includes a text message application that is able to receive, display, and send text messages.

S-CSCF 106 comprises any server(s), function(s), or other system operable to provide session control for an IMS wireline phone 132 that is accessing services within IMS network 100. An IMS wireline phone 132 comprises a fixed-line device that is able to register with and communicate with IMS network 100, but is not capable of handling text messages. A text messages comprises an IMS SMS message, or another type of text-based message that is initiated through a store-and-forward type protocol, such as SMS. A wireline phone that is not capable of handling text messages does not include a text message application or text message functionalities to allow the phone to receive, display, or send text messages in a normal fashion. The normal fashion of receiving, displaying, or sending text messages may be thought of as an IMS Short Messaging Service. One example of a wireline phone that is not capable of handling text messages is a VoIP phone that is SIP enabled, but is not text-enabled.

Although wireline phone 132 is not text-enabled, wireline phone 132 includes an associated caller ID unit that provides caller ID functionalities. The caller ID unit may be integral to wireline phone 132, or may be implemented as an external unit. A caller ID unit comprises a component or application that is able to process and/or display caller ID information for calls. For example, the caller ID unit may process call signaling to identify a caller name and directory number, and display the caller name and directory number on a screen.

Although two S-CSCF's are shown in FIG. 1, those skilled in the art will appreciate that a single S-CSCF could serve both IMS device 122 and wireline phone 132. Also, IMS network 100 may also include other network elements not shown, such as a Home Subscriber Server (HSS).

Text message system 104 comprises any server(s), function(s), or other system(s) operable to manage the interchange of text messages within IMS network 100. One example of a text message system 104 is an SMSC. In this embodiment, text message system 104 includes a capability system 112 and a message forwarding system 114. Capability system 112, message forwarding system 114, and text message system 104 as a whole may be implemented as hardware, software, firmware, or some combination of these. For example, capability system 112 and message forwarding system 114 may be implemented as a processor executing instructions, or may be implemented as a programmable gate array, a circuit or circuitry, logic, or some other physical electronic implementation that is not entirely software based. Capability system 112 and message forwarding system 114 may be implemented as individual systems, sub-systems, modules, or components configured to perform functions described herein. The operation of capability system 112 and message forwarding system 114 are described below.

Figure 2:
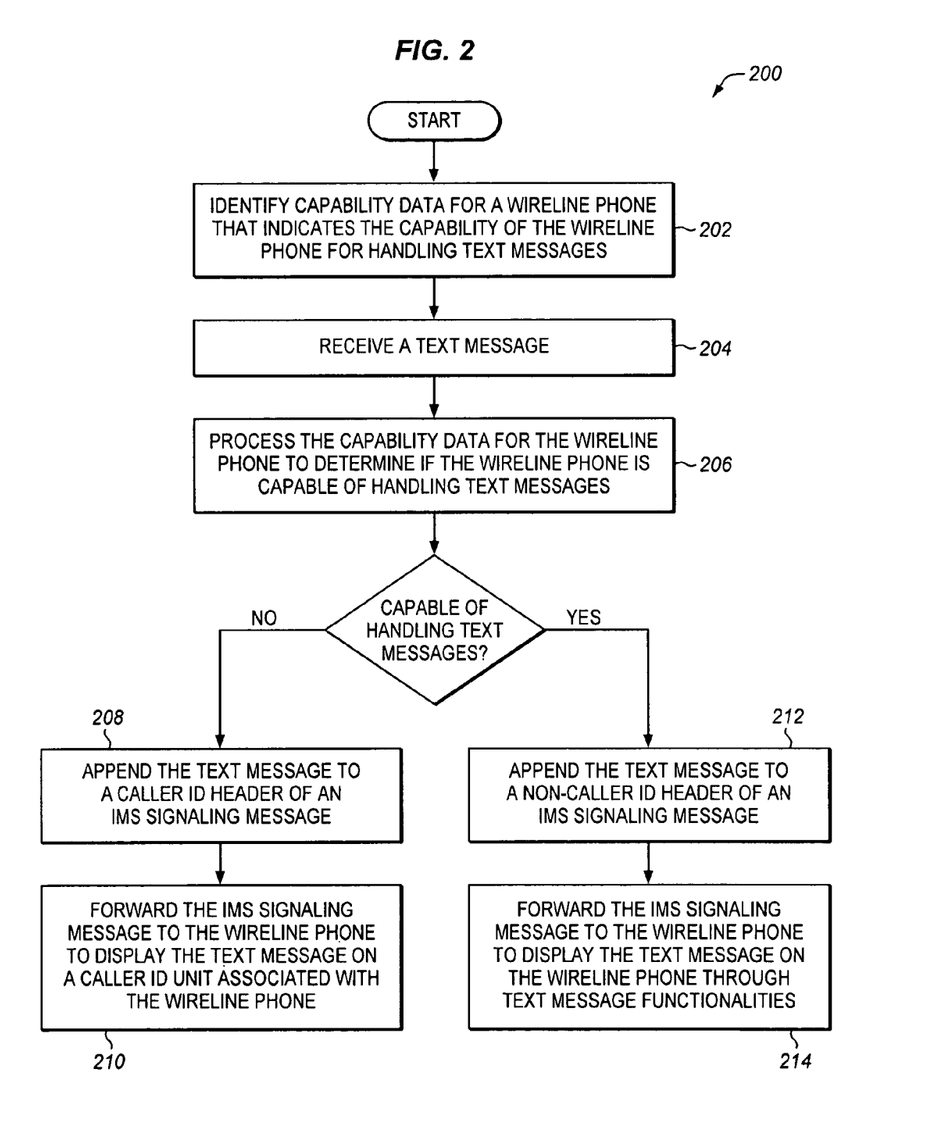
FIG. 2 is a flow chart illustrating a method of delivering text messages to wireline phones in an exemplary embodiment of the invention.

FIG. 2 is a flow chart illustrating a method 200 of delivering text messages to wireline phones in an exemplary embodiment of the invention. The steps of method 200 will be described with reference to IMS network 100 in FIG. 1. The steps of the flow chart in FIG. 2 are not all inclusive and may include other steps not shown.

In step 202, capability system 112 identifies capability data for wireline phone 132. The capability data defines or indicates the capability of wireline phone 132 for handling text messages. For example, the capability data may indicate that wireline phone 132 is able to handle text messages, or may indicate that wireline phone 132 is not able to handle text messages.

Capability system 112 may identify the capability data in a variety of ways. In one embodiment, capability system 112 may query wireline phone 132 to retrieve capability data that is pre-defined and stored on wireline phone 132, or is entered by recipient 131. In another embodiment, capability system 112 may query a Home Subscriber Server (HSS) in IMS network 100 (not shown in FIG. 1) to retrieve capability data that is pre-defined and stored in the HSS, such as in a service profile for recipient 131. In either of these embodiments, capability system 112 retrieves and stores the capability data for wireline phone 132.

In another embodiment, wireline phone 132 may report the capability data to capability system 112 during registration with IMS network 100. To register with IMS network 100 initially (or to re-register), wireline phone 132 generates a register request message. The register request message may comprise a SIP REGISTER or a message of another protocol. To report the capability data in this embodiment, wireline phone 132 inserts capability data into a register request message, and transmits the register request message to IMS network 100. S-CSCF 106 receives the register request message, and determines that the register request message should be sent to text message system 104. For example, S-CSCF 106 downloads the service profile for recipient 131, which indicates that register request messages received from wireline phone 132 should be forwarded to text message system 104. Thus, S-CSCF 106 forwards the register request message to text message system 104. Capability system 112 receives the register request message from S-CSCF 106, and processes the register request message to identify the capability data inserted in the register request message. For example, if the register request message comprises a SIP REGISTER, then the capability system 112 may process the SIP Supported header in the SIP REGISTER to identify the capability data. The SIP Supported header includes a tag that enumerates the capabilities of wireline phone 132, such as for handling text messages. Capability system 112 then stores the capability data for wireline phone 132 so that text messages destined for wireline phone 132 can be handled properly.

In FIG. 1, assume that sender 121 wants to send a text message to recipient 131 through IMS network 100. Sender 121 enters the proper commands to instruct IMS device 122 to send the text message. Responsive to the instructions, IMS device 122 appends the text message to a text message header in an IMS signaling message. For example, if the IMS protocol is SIP, then IMS device 122 may append the text message to a Content-Length header of a SIP MESSAGE or SIP INVITE. IMS device 122 then sends the IMS signaling message to IMS network 100. S-CSCF 102 in IMS network 100 receives the IMS signaling message, and determines that the IMS signaling message includes a text message. S-CSCF 102 then forwards the IMS signaling message to text message system 104.

In step 204 of FIG. 2, message forwarding system 114 receives the IMS text message from S-CSCF 102. In step 206, message forwarding system 114 processes the capability data for wireline phone 132 to determine if wireline phone 132 is capable of handling text messages. If wireline phone 132 is not capable of handling text messages, then message forwarding system 114 appends the text message to a caller identifier (ID) header of the same or another IMS signaling message in step 208. A caller ID header comprises any header that is defined for caller ID information, such as a caller name and/or directory number. Most signaling protocols have defined one or more headers, fields, parameters, etc, for caller ID information. For instance, SIP has defined multiple headers for caller ID information. One header is the P-Asserted-Identity header, another header is the Call-ID header, and another header is the Call-Info header. Message forwarding system 114 may thus append, encapsulate, insert, or otherwise include the text message in the P-Asserted-Identity header, the Call-ID header, or the Call-Info header of a SIP message if wireline phone 132 is not capable of receiving text messages. In step 210, message forwarding system 114 forwards the IMS signaling message to wireline phone 132 to display the text message on a caller ID unit associated with wireline phone 132 (i.e., display the text message through caller ID functionalities).

In response to receiving the IMS signaling message, caller ID functionalities in wireline phone 132 process the caller ID header(s) in the signaling message to extract the data appended to one of the caller ID headers. In this embodiment, the caller ID functionalities extract the text message that was appended to the caller ID header, and display the text message through an associated caller ID unit. The caller ID functionalities are able to display the text message because the text message comprises characters comparable to traditional caller ID information. Thus, the caller ID functionalities in wireline device 132 process the text message as if it were caller ID information, and displays the text message on the caller ID unit.

Figure 3:
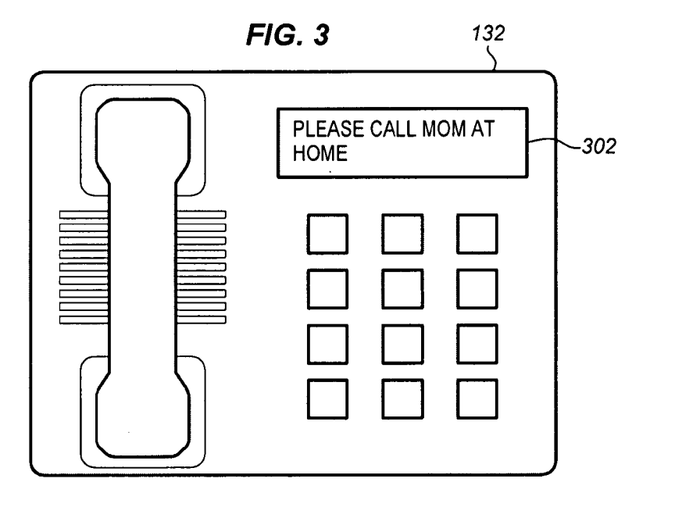
FIG. 3 illustrates a wireline phone in an exemplary embodiment of the invention.

Assume for example that the text message reads "PLEASE CALL MOM AT HOME". FIG. 3 illustrates wireline phone 132 in an exemplary embodiment of the invention. Wireline phone 132 includes caller ID functionalities, including a caller ID unit 302 that is able to display caller ID information. Caller ID functionalities comprise any components, devices, or processes that are able to display caller ID information that is provided in a signaling message. Although caller ID unit 302 is illustrated as integral to wireline phone 132, those skilled in the art will appreciate that caller ID unit 302 may be an external device. When caller ID unit 302 receives the text message as caller ID information, caller ID unit 302 displays the text message as if the text message were caller ID information.

In FIG. 2, if wireline phone 132 is capable of handling text messages, then message forwarding system 114 appends the text message to a non-caller ID header of the IMS signaling message in step 212. A non-caller ID header comprises any header that is not defined for caller ID information, but is defined for another type of call information. For instance, SIP has defined a Content-Length header where text messages are appended according to normal text messaging functionalities. Message forwarding system 114 may thus append, encapsulate, insert, or otherwise include the text message in the Content-Length header of a SIP message if wireline phone 132 is capable of receiving a text message. In step 214, message forwarding system 114 forwards the IMS signaling message to wireline phone 132 to display the text message on wireline phone 132 through text message functionalities.

In response to receiving the IMS signaling message, text message functionalities in wireline phone 132 process the non-caller ID header(s) in the signaling message to extract the text message. The text message functionalities then display the text message through a text message interface. This process of displaying the text message represents the process traditionally performed for SMS protocols and other similar protocols.

By identifying the capabilities of wireline phone 132 and appending a text message to a caller ID header of an IMS signaling message as described above, wireline phone 132 is able to receive text messages even though it does not include text message functionalities. The caller ID functionalities of the wireline phone 132 are used instead to receive and display the text messages. As a result, service providers are advantageously able to provide text messaging to additional subscribers.

Figure 4:
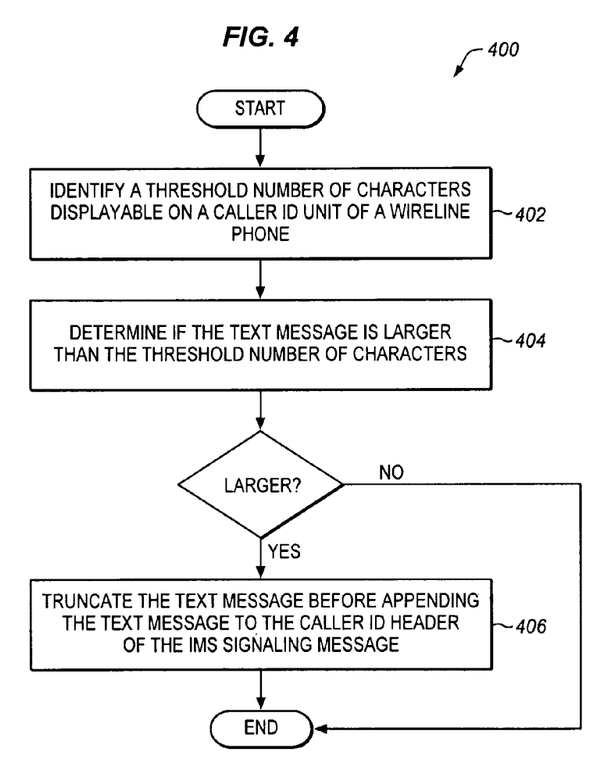
FIG. 4 is a flow chart illustrating a method of truncating text messages in an exemplary embodiment of the invention.
Figure 5:
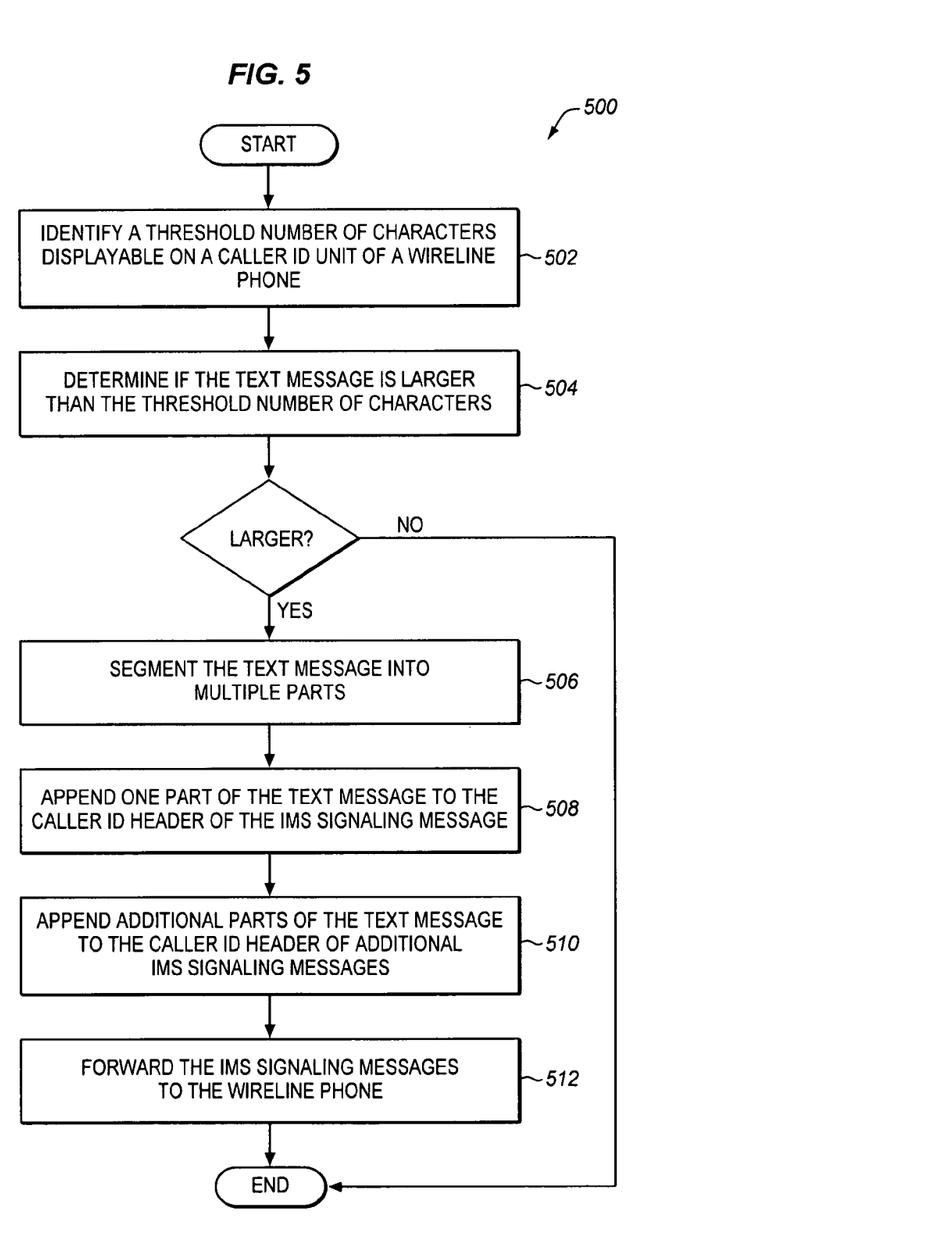
FIG. 5 is a flow chart illustrating a method of segmenting text messages in an exemplary embodiment of the invention.

Traditional text message protocols, such as SMS, allow for about 160 characters. A typical caller ID unit will not be able to display 160 characters. For example, a common caller ID unit will be able to display 40 characters or less. FIGS. 4-5 illustrate two ways of handling text messages that are larger than the display of the caller ID unit.

FIG. 4 is a flow chart illustrating a method 400 of truncating text messages in an exemplary embodiment of the invention. In step 402, message forwarding system 114 identifies a threshold number of characters displayable on a caller ID unit 302 of wireline phone 132. To identify the threshold number, message forwarding system 114 may process the capability data for wireline phone 132 which indicates the number of characters displayable on caller ID unit 302. Message forwarding system 114 may alternatively use a default threshold, such as 40 characters. In step 404, message forwarding system 114 determines if the text message is larger than the threshold number of characters. If the text message is larger than the threshold number of characters, then message forwarding system 114 truncates the text message before appending the text message to the caller ID header of the IMS signaling message in step 406. For example, if the text message is 60 characters and the threshold number of characters for caller ID unit 302 is 40 characters, then message forwarding system 114 may truncate the text message so that the first 40 characters of the text message are appended to the IMS signaling message. Wireline phone 132 will then display the first 40 characters of the text message.

FIG. 5 is a flow chart illustrating a method 500 of segmenting text messages in an exemplary embodiment of the invention. In step 502, message forwarding system 114 identifies a threshold number of characters displayable on a caller ID unit 302 of wireline phone 132. In step 504, message forwarding system 114 determines if the text message is larger than the threshold number of characters. If the text message is larger than the threshold number of characters, then message forwarding system 114 segments the text message into multiple parts in step 506. Each part of the text message includes less than or equal to the threshold number of characters. In step 508, message forwarding system 114 appends one part of the text message to the caller ID header of the IMS signaling message. In step 510, message forwarding system 114 appends additional parts of the text message to the caller ID header of additional IMS signaling messages. In step 512, message forwarding system 114 forwards the IMS signaling messages to wireline phone 132.

For example, if the text message is 100 characters and the threshold number of characters for caller ID unit 302 is 40 characters, then message forwarding system 114 may segment the text message into 3 parts. The first part includes the first 40 characters of the text message, the second part includes the next 40 characters of the text message, and the third part includes the last 20 characters of the text message. Message forwarding system 114 appends each of the three parts to an IMS signaling message, and forwards the messages to wireline phone 132. Wireline phone 132 will then display the three parts in series, responsive to receiving the IMS signaling messages, so that recipient 131 can view the entire text message.

Example

Figure 6:
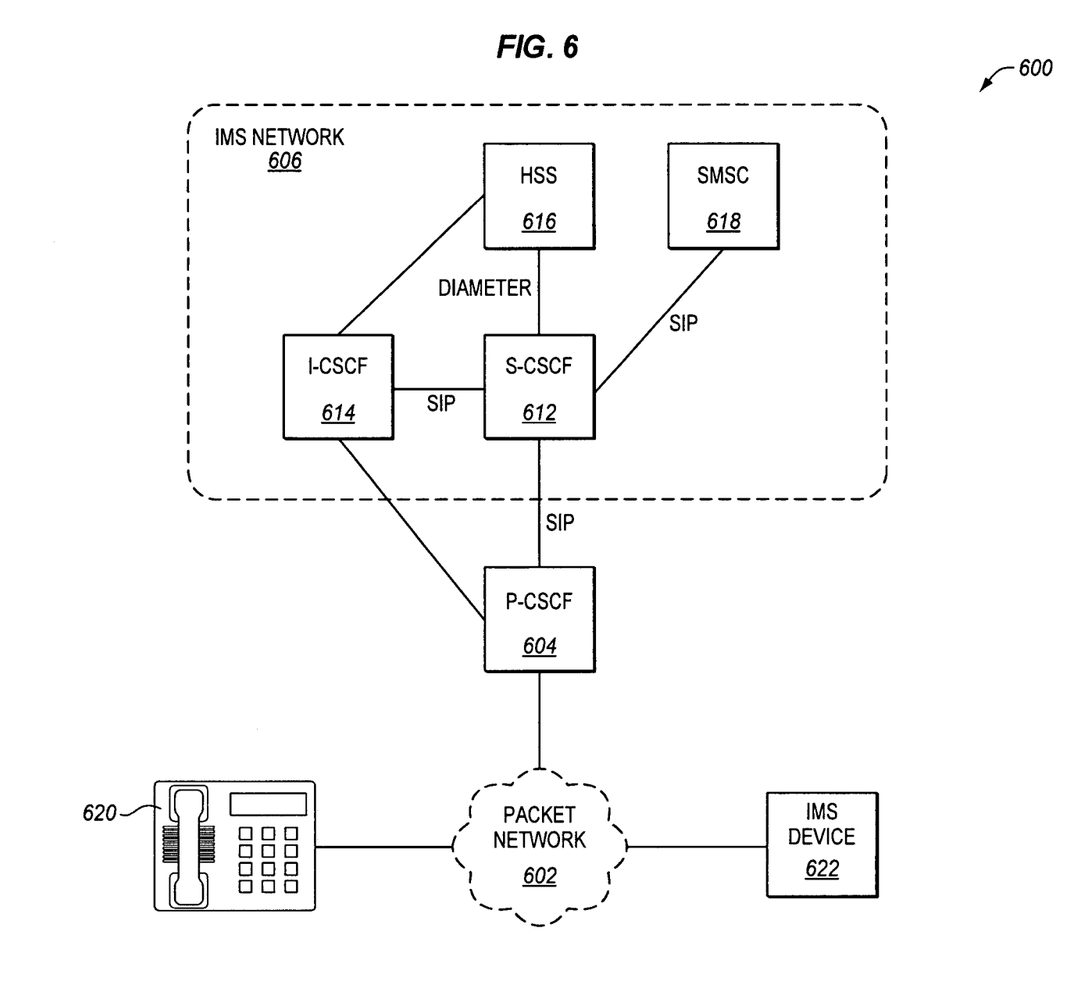
FIG. 6 illustrates a communication network in an exemplary embodiment of the invention.
Figure 7:
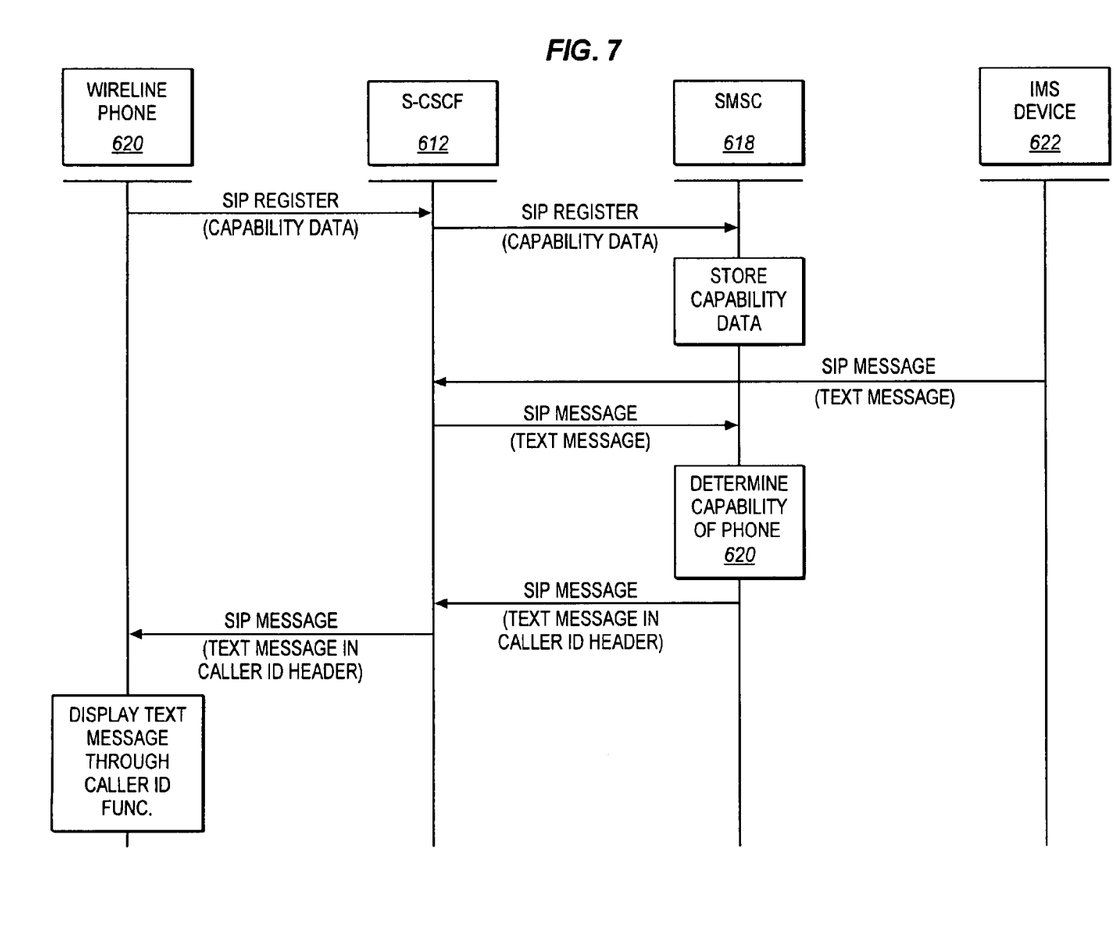
FIG. 7 is a message diagram illustrating messaging used to deliver a text message to a wireline phone in an exemplary embodiment of the invention.

FIGS. 6-7 illustrate an example of operating an IMS network to provide text messages to a wireline phone through caller ID functionalities. FIG. 6 illustrates communication network 600 in an exemplary embodiment of the invention. Communication network 600 includes a packet network 602, a Proxy-CSCF (P-CSCF) 604, and an IMS network 606. IMS network 606 includes an S-CSCF 612, an Interrogate-CSCF (I-CSCF) 614, an HSS 616, and an SMSC 618 (also referred to as a text message system). A wireline phone 620 connects to IMS network 606 through packet network 602. In this example, wireline phone 620 is not capable of handling text messages in a normal fashion. An IMS device 622 also connects to IMS network 606 through packet network 602. IMS device 622 is text-enabled and is being operated by a user that wants to send a text message to a user of wireline phone 620.

FIG. 7 is a message diagram illustrating messaging used to deliver a text message to wireline phone 620 in an exemplary embodiment of the invention. The message diagram illustrates SIP used within IMS network 600. To begin, wireline phone 620 registers with IMS network 606. To register with IMS network 606 in this embodiment, wireline phone 620 generates a SIP REGISTER, and inserts capability data in the SIP REGISTER. The capability data indicates the capability of wireline phone 620 for handling text messages. Wireline phone 620 then transmits the SIP REGISTER to P-CSCF 604 through packet network 602. P-CSCF 604 forwards the REGISTER message to S-CSCF 612 (through I-CSCF 614).

Responsive to receiving the SIP REGISTER, S-CSCF 612 processes the SIP REGISTER in a traditional manner to register wireline phone 620 with IMS network 606. S-CSCF 612 also processes the service profile for the user of wireline phone 620, which is retrieved from HSS 616, to determine if SIP REGISTER's should be forwarded to SMSC 618. In this embodiment, the service profile indicates that SIP REGISTER's should be forwarded to SMSC 618, so S-CSCF 612 forwards the SIP REGISTER to SMSC 618. SMSC 618 processes the SIP REGISTER to identify the capability data for wireline phone 620, and stores the capability data in a local database.

Assume that the user of IMS device 622 sends a text message to a user of wireline phone 620 that reads "PLEASE CALL MOM AT HOME". IMS device 622 thus generates a SIP INVITE or SIP MESSAGE, and inserts the text message in a non-caller ID header of the SIP message. IMS device 622 then transmits the SIP message to P-CSCF 604 through packet network 602. P-CSCF 604 forwards the SIP message to S-CSCF 612, which forwards the SIP message to SMSC 618. SMSC 618 processes the SIP message to identify the text message that is appended to the SIP message.

Before sending the text message to wireline phone 620, SMSC 618 processes the capability data for wireline phone 620 to determine if wireline phone 620 is capable of handling text messages. Because wireline phone 620 is not capable of handling text messages, SMSC 618 cannot deliver the text message to wireline phone 620 using traditional SMS protocols. Instead, SMSC 618 appends the text message to a caller ID header of the same or another SIP message. For example, the following message is a SIP INVITE with the text message appended to the P-Asserted-Identity header:

INVITE sip:+14085551212@proxy.pstn.net SIP/2.0
Via: SIP/2.0/TCP useragent.cisco.com;branch=z9hG4bK-124
Via: SIP/2.0/TCP proxy.cisco.com;branch=z9hG4bK-abc
To: <sip:+14089990000 cisco.com>
From: "Anonymous"<sip:anonymous@anonymous.invalid>;tag=9802748
Call-ID: 245780247857024504
CSeq: 2 INVITE
Max-Forwards: 69
P-Asserted-Identity: "PLEASE CALL MOM AT HOME"<sip:name@cisco.com>
P-Asserted-Identity: tel:+14089990000
Privacy: id Another example is a SIP MESSAGE with the text message appended to the P-Asserted-Identity header as follows:
MESSAGE sip:+14085551212@proxy.pstn.net SIP/2.0
Via: SIP/2.0/TCP useragent.cisco.com;branch=z9hG4bK-124
Via: SIP/2.0/TCP proxy.cisco.com;branch=z9hG4bK-abc
To: <sip:+14085551212@cisco.com>
From: "Anonymous"<sip:anonymous@anonymous.invalid>;tag=9802748
Route: S-CSCF SIP URI
Contact: <sip: 192.11.34.55>;expires=600000

Call-ID: 245780247857024504
CSeq: 2 INVITE
Max-Forwards: 69
P-Asserted-Identity: "Randy Smith"<sip:name@cisco.com>
P-Asserted-Identity: tel:+14089990000
P-Asserted-Identity: "PLEASE CALL MOM AT HOME"
Privacy: id
Content-Type:application/sms
Content-Length: 120(Length of Transport Layer Message)

After appending the text message to a caller ID header of the SIP message, SMSC 618 forwards the SIP message to wireline phone 620 through S-CSCF 612, P-CSCF 604, and packet network 602. In response to receiving the SIP message, wireline phone 620 processes the P-Asserted-Identify header to extract the appended data. In this embodiment, the caller ID functionalities in wireline phone 620 extract the text message appended to the P-Asserted-Identify header, and display the text message on an associated caller ID unit. The caller ID functionalities are able to display the text message because the text message comprises characters comparable to traditional caller ID information. Thus, the caller ID functionalities in wireline device 620 process the text message as if it were caller ID information, and displays the text message on the caller ID unit.

Although specific embodiments were described herein, the scope of the invention is not limited to those specific embodiments. The scope of the invention is defined by the following claims and any equivalents thereof.

We claim:

1. A system comprising:
a text message system of an IP Multimedia Subsystem (IMS) network;
the text message system comprising:
a capability system operable to identify capability data for an IMS wireline phone that indicates the capability of the IMS wireline phone for handling text messages; and
a message forwarding system operable to receive a text message intended for the IMS wireline phone that has registered for service with the IMS network, to process the capability data for the IMS wireline phone to determine if the IMS wireline phone is capable of handling text messages, to append the text message to a caller identifier (ID) header of a Session Initiation Protocol (SIP) message responsive to a determination that the IMS wireline phone is not capable of handling text messages, and to forward the SIP message to the IMS wireline phone to display the text message on a caller ID unit associated with the IMS wireline phone.

2. The system of claim 1 wherein:
the message forwarding system is further operable to append the text message to a non-caller ID header of the SIP message responsive to a determination that the IMS wireline phone is capable of handling text messages, and to forward the SIP message to the IMS wireline phone to display the text message on the IMS wireline phone through text message functionalities.

3. The system of claim 1 wherein:
the message forwarding system is further operable to identify a threshold number of characters displayable on the caller ID unit of the IMS wireline phone, to determine if the text message is larger than the threshold number of characters, and to truncate the text message before appending to the caller ID header of the SIP message if the text message is larger than the threshold number of characters.

4. The system of claim 1 wherein:
the message forwarding system is further operable to identify a threshold number of characters displayable on the caller ID unit of the IMS wireline phone, to determine if the text message is larger than the threshold number of characters, to segment the text message into multiple parts if the text message is larger than the threshold number of characters, to append one part of the text message to the caller ID header of the SIP message, to append additional parts of the text message to the caller ID header of additional SIP messages, and to forward the SIP messages to the IMS wireline phone.

5. The system of claim 1 wherein:
the capability system is further operable to receive a register request message initiated by the IMS wireline phone to register with the IMS network, to process the register request message to identify the capability data inserted in the register request message, and to store the capability data for the IMS wireline phone.

6. The system of claim 5 wherein:
the register request message comprises a SIP REGISTER; and
the capability system is further operable to process a SIP Supported header in the SIP REGISTER to identify the capability data.

7. The system of claim 1 wherein:
the message forwarding system is further operable to append the text message to a P-Asserted-Identity header of the SIP message responsive to a determination that the IMS wireline phone is not capable of handling text messages.

8. A method of delivering text messages in an IP Multimedia Subsystem (IMS) network to IMS wireline phones, the method comprising:
identifying capability data for an IMS wireline phone that indicates the capability of the IMS wireline phone for handling text messages;
receiving a text message intended for the IMS wireline phone that has registered for service with the IMS network;
processing the capability data for the IMS wireline phone to determine if the IMS wireline phone is capable of handling text messages;
appending the text message to a caller identifier (ID) header of a Session Initiation Protocol (SIP) message responsive to a determination that the IMS wireline phone is not capable of handling text messages; and
forwarding the SIP message to the IMS wireline phone to display the text message on a caller ID unit associated with the IMS wireline phone.

9. The method of claim 8 further comprising:
appending the text message to a non-caller ID header of the SIP message responsive to a determination that the IMS wireline phone is capable of handling text messages; and
forwarding the SIP message to the IMS wireline phone to display the text message on the IMS wireline phone through text message functionalities.

10. The method of claim 8 further comprising:
identifying a threshold number of characters displayable on the caller ID unit of the IMS wireline phone;
determining if the text message is larger than the threshold number of characters; and
truncating the text message before appending to the caller ID header of the SIP message if the text message is larger than the threshold number of characters.

11. The method of claim 8 further comprising:
identifying a threshold number of characters displayable on the caller ID unit of the IMS wireline phone;
determining if the text message is larger than the threshold number of characters;
segmenting the text message into multiple parts if the text message is larger than the threshold number of characters;
appending one part of the text message to the caller ID header of the SIP message;
appending additional parts of the text message to the caller ID header of additional SIP messages; and
forwarding the SIP messages to the IMS wireline phone.

12. The method of claim 8 wherein identifying capability data for an IMS wireline phone comprises:
receiving a register request message initiated by the IMS wireline phone to register with the IMS network;
processing the register request message to identify the capability data inserted in the register request message; and
storing the capability data for the IMS wireline phone.

13. The method of claim 12 wherein the register request message comprises a SIP REGISTER, and further comprising:
processing a SIP Supported header in the SIP REGISTER to identify the capability data.

14. The method of claim 8 further comprising:
appending the text message to a P-Asserted-Identity header of the SIP message responsive to a determination that the IMS wireline phone is not capable of handling text messages.

15. An IP Multimedia Subsystem (IMS) network operable to deliver text messages to IMS wireline phones, the IMS network comprising:
a Serving-Call Session Control Function (S-CSCF) operable to receive a text message intended for an IMS wireline phone that has registered for service with the IMS network; and
a text message system operable to receive the text message from the S-CSCF, to identify capability data for the IMS wireline phone that indicates the capability of the IMS wireline phone for handling text messages, to process the capability data for the IMS wireline phone to determine if the IMS wireline phone is capable of handling text messages, to append the text message to a caller identifier (ID) header of a Session Initiation Protocol (SIP) message responsive to a determination that the IMS wireline phone is not capable of handling text messages, and to forward the SIP message to the IMS wireline phone to display the text message on the IMS wireline phone through caller ID functionalities.

16. The IMS network of claim 15 wherein:
the text message system is further operable to append the text message to a non-caller ID header of the SIP message responsive to a determination that the IMS wireline phone is capable of handling text messages, and to forward the SIP message to the IMS wireline phone to display the text message on the IMS wireline phone through text message functionalities.

17. The IMS network of claim 15 wherein:
the text message system is further operable to identify a threshold number of characters displayable through the caller ID functionalities of the IMS wireline phone, to determine if the text message is larger than the threshold number of characters, and to truncate the text message before appending to the caller ID header of the SIP message if the text message is larger than the threshold number of characters.

18. The IMS network of claim 15 wherein:
the text message system is further operable to identify a threshold number of characters displayable through the caller ID functionalities of the IMS wireline phone, to determine if the text message is larger than the threshold number of characters, to segment the text message into multiple parts if the text message is larger than the threshold number of characters, to append one part of the text message to the caller ID header of the SIP message, to append additional parts of the text message to the caller ID header of additional SIP messages, and to forward the SIP messages to the IMS wireline phone.

19. The IMS network of claim 15 wherein:
the S-CSCF is further operable to receive a register request message initiated by the IMS wireline phone to register with the IMS network, and to forward the register request message to the text message system; and
the text message system is further operable to process the register request message to identify the capability data inserted in the register request message, and to store the capability data for the IMS wireline phone.

20. The IMS network of claim 15 wherein:
the text message system is further operable to append the text message to a P-Asserted-Identity header of the SIP message responsive to a determination that the IMS wireline phone is not capable of handling text messages.

* * * * *